May 27, 1947.                L. W. RAWSON                2,421,083
                         CENTRIFUGAL COUPLING
                         Filed Dec. 27, 1943

Inventor
LOUIS W. RAWSON
By Albert G. Blodgett
Attorney

Patented May 27, 1947

2,421,083

UNITED STATES PATENT OFFICE 2,421,083

CENTRIFUGAL COUPLING

Louis W. Rawson, Worcester, Mass., assignor to Worcester Polytechnic Institute, Worcester, Mass., a corporation of Massachusetts Application December 27, 1943, Serial No. 515,874

7 Claims. (Cl. 192—105)

This invention relates to centrifugal couplings, and more particularly to couplings of the type utilizing revoluble friction shoes for transmitting power from one rotatable element to another.

Centrifugal couplings of this type as heretofore constructed comprise two axially aligned rotatable elements one of which provides a drum having a cylindrical inner surface, and the other of which provides pockets for the reception of the friction shoes. These shoes move outwardly under the influence of centrifugal force into contact with the inner surface of the drum. The sides of the pockets provide abutments which engage the sides of the shoes and thus transmit the driving torque. The shoes are ordinarily made with a metal body, to afford the necessary weight, having an outer convex cylindrical surface protected by a curved sheet of frictional material. The pressure between the abutments and the shoes is high, and in the operation of the coupling there will be a rubbing movement between these parts unless perfect axial alignment is maintained, which is seldom possible in practice. Consequently, wear on the abutments and shoes has been a serious problem, and in addition the couplings have been noisy in operation. To overcome this difficulty, it has been proposed to extend the friction material slightly beyond the metal body of the shoe and to add a further sheet of friction material to the inner surface of the shoe, both of these sheets presenting edgewise surfaces for engagement with the adjacent abutments. This proposed construction has proven to be unsatisfactory in service. After a relatively short period of operation the friction material breaks down and metal to metal contact takes place, followed by wear on the shoes and abutments, and excessive noise.

It is accordingly one object of the invention to overcome these difficulties and to provide a centrifugal coupling which will operate satisfactorily for long periods of service even under conditions of poor alignment.

It is a further object of the invention to provide an improved friction shoe for use in centrifugal couplings and capable of increasing greatly the useful life of such apparatus.

It is a further object of the invention to provide a simple and relatively inexpensive friction shoe for use in centrifugal couplings and so constructed as to minimize wear on the parts thereof.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a longitudinal section through a centrifugal coupling, taken on the line 1—1 of Fig. 2;

Figure 1:
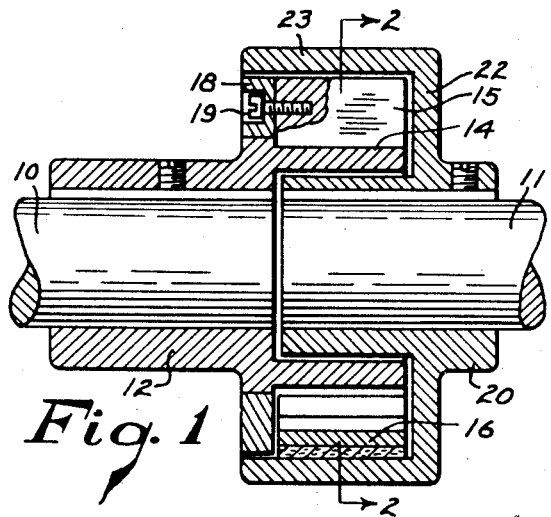

The embodiment illustrated comprises a driving shaft 10 and a driven shaft 11 axially aligned therewith. On the driving shaft 10 there is mounted a hub 12 having a hollow cylindrical portion 14 projecting coaxially therefrom. The cylindrical portion 14 is provided with a series of outwardly projecting radial ribs or abutments 15 forming pockets therebetween for the reception of friction shoes 16. These ribs have approximately radial plane surfaces for contact with the shoes. A ring 18 is removably fastened by means of screws 19 to the ribs 15 in order to close the ends of the pockets adjacent the hub 12, while permitting access to the shoes. On the driven shaft 11 there is mounted a hub 20 which is connected by an outwardly extending transverse web 22 to a hollow cylindrical drum 23. This drum surrounds the friction shoes 16. As the driving shaft 10 rotates, the ribs 15 will force the shoes 16 to revolve, and centrifugal force will cause the shoes to move outwardly into frictional engagement with the inner surface of the drum 23, thus driving this drum and the shaft 11 connected thereto.

Figure 3:
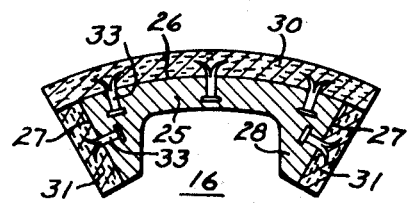
Fig. 3 is an enlarged sectional view of one of the friction shoes forming part of the coupling.
Figure 2:
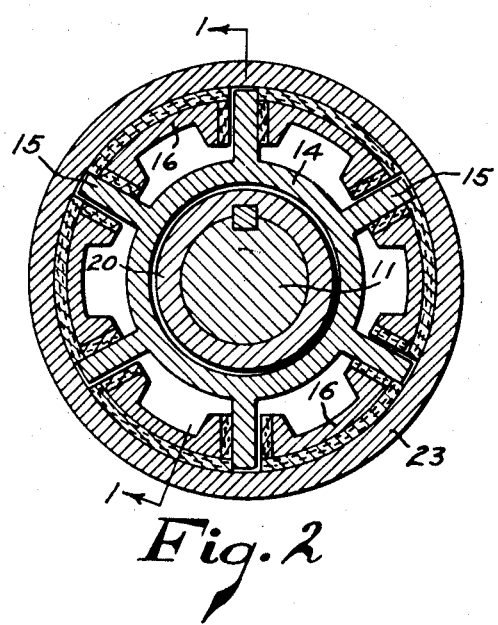
Fig. 2 is a section on the line 2—2 of Fig. 1.
Figure 4:
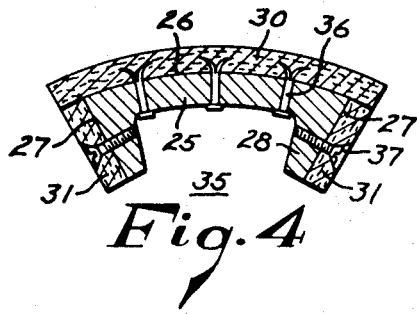
Fig. 4 is a view similar to Fig. 3, showing a modification.

Referring now to Fig. 3, it will be seen that each shoe 16 comprises a metal body 25 having an arcuate convex cylindrical outer surface 26 and two plane side surfaces 27 extending inwardly from the surface 26. The plane surfaces 27 preferably converge in the inward direction, and they are formed on two ribs 28 which extend inwardly at the opposite sides of the body 25. A sheet 30 of a suitable friction material is secured in contact with the outer surface 26, this sheet being of uniform thickness and suitably curved to conform with the shape of the contacting surface. A separate flat sheet 31 of a suitable friction material is secured in contact with each of the plane side surfaces 27, these sheets likewise being of uniform thickness. The marginal portions of the curved sheet 30 preferably overlap the outer edges of the flat sheets 31. The three sheets of friction material are formed in three separate pieces, preferably of a suitable non-metallic friction material, such as molded or woven asbestos brake lining. In order to hold the various parts of each shoe together, bifurcated rivets 33 are driven into the sheets of friction material, these pieces are placed in a suitable mold, and molten lead is poured into the mold to form the body 25, the heads of the rivets being embedded in the lead, If the body 25 is to be made of cast iron or other metal which melts at too high a temperature for pouring into contact with the friction material, I may construct a shoe 35 as shown in Fig. 4. This construction is similar to that of Fig. 3, except that the curved sheet 30 is held in place by means of bifurcated rivets 36 which extend through drilled holes in the body 25, and the flat sheets 31 are held in place on the ribs 28 by means of screws 37 having countersunk heads.

Figure 5:
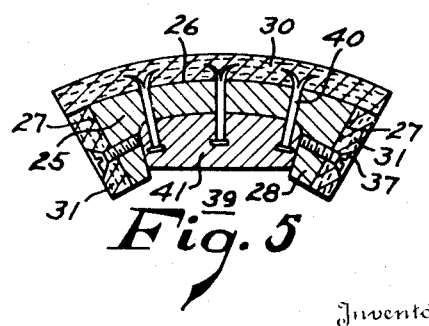
Fig. 5 is a view similar to Fig. 3, showing a further modification.

Fig. 5 shows a shoe 39 similar to that of Fig. 4, except that somewhat longer bifurcated rivets 40 are employed, and lead 41 is poured into the body 25 to embed the rivet heads and increase the weight of the shoe.

It will now be apparent that in the operation of the coupling, the full driving torque will be transmitted by the direct pressure of the flat surfaces of the abutments 15 against the flat sheets 31 of friction material. Hence these sheets will be subjected to direct compressive stress in the direction of their thickness, with no tendency to buckle the sheets. Because of the large area afforded by the wide surfaces of the sheets, the unit compressive stress will be relatively low. The ribs 28 provide the wide flat surfaces 27 which form a solid metal backing for the sheets 31 and prevent distortion thereof under compressive loading. If misalignment occurs between the shafts 10 and 11, there will be a rubbing action between the abutments 15 and the sheets 31, but the nature of the friction material is such as to minimize wear and noise under these conditions, and the mounting of the sheets is such as to avoid any tendency to strip them from the bodies 25.

The construction is relatively simple and inexpensive to manufacture, and well adapted for its intended purpose.

Having thus described my invention, what I claim as new and desire to secure by Letters Patent is:

1. A centrifugal coupling comprising two relatively rotatable coaxial members one of which provides a drum with an inner cylindrical surface and the other of which provides a series of circumferentially spaced abutments surrounded by the drum, and shoes mounted between the abutments, each shoe including a metal body having an arcuate convex cylindrical outer surface and two plane side surfaces, a curved sheet of friction material secured to the outer surface of the body to engage the inner surface of the drum under the influence of centrifugal force, and a separate flat sheet of non-metallic friction material secured to each of the side surfaces of the body to engage the abutments and to be thereby subjected to a direct compressive stress in the direction of its thickness.

2. A centrifugal coupling comprising two relatively rotatable coaxial members one of which provides a drum with an inner cylindrical surface and the other of which provides a series of circumferentially spaced abutments surrounded by the drum, the abutments having approximately radial plane surfaces, and shoes mounted between the abutments, each shoe including a metal body having an arcuate convex cylindrical outer surface and two approximately radial plane side surfaces, a curved sheet of friction material secured to the outer surface of the body to engage the inner surface of the drum under the influence of centrifugal force, and a separate flat sheet of non-metallic friction material secured to each of the side surfaces of the body to engage the plane surfaces of the abutments and to be thereby subjected to a direct compressive stress in the direction of its thickness.

3. A shoe for a centrifugal coupling comprising a metal body having an arcuate convex cylindrical outer surface and two plane side surfaces extending inwardly from the said outer surface, a curved sheet of friction material secured to the said outer surface, and a separate flat sheet of non-metallic friction material secured to each of the said side surfaces in a position to be subjected to a direct compressive stress in the direction of its thickness.

4. A shoe for a centrifugal coupling comprising a metal body having an arcuate convex cylindrical outer surface and two approximately radial plane side surfaces extending inwardly from the said outer surface, a curved sheet of friction material secured to the said outer surface, and a separate flat sheet of non-metallic friction material secured to each of the said side surfaces in a position to be subjected to a direct compressive stress in the direction of its thickness.

5. A shoe for a centrifugal coupling comprising a metal body having an arcuate convex cylindrical outer surface and two plane side surfaces extending inwardly from the said outer surface, a curved sheet of friction material secured to the said outer surface, and a separate flat sheet of non-metallic friction material secured to each of the said side surfaces, the marginal portions of the curved sheet overlapping the outer edges of the flat sheets.

6. A shoe for a centrifugal coupling comprising a metal body having an arcuate convex cylindrical outer surface, the body including two inwardly extending ribs at opposite sides thereof shaped to provide two plane side surfaces which extend inwardly from the said outer surface, a curved sheet of friction material secured to the said outer surface, and a separate flat sheet of non-metallic friction material secured to each of the said side surfaces in a position to be subjected to a direct compressive stress in the direction of its thickness.

7. A shoe for a centrifugal coupling comprising a metal body having an arcuate convex cylindrical outer surface, the body including two inwardly extending ribs at opposite sides thereof shaped to provide two approximately radial plane side surfaces which extend inwardly from the said outer surface, a curved sheet of friction material secured to the said outer surface, and a separate flat sheet of non-metallic friction material secured to each of the said side surfaces, the marginal portions of the curved sheet overlapping the outer edges of the flat sheets.

LOUIS W. RAWSON.

REFERENCES CITED

The following references are of record in the file of this patent:

UNITED STATES PATENTS

| Number | Name | Date |
|---|---|---|
| 2,317,573 | Wilson | Apr. 27, 1943 |
| 2,148,243 | Nahigyan et al. | Feb. 21, 1939 |
| 1,866,291 | Bryson | July 5, 1932 |
| 1,727,467 | Johnson | Sept. 19, 1929 |
| 1,703,694 | Rushton | Feb. 26, 1929 |

FOREIGN PATENTS

| Number | Country | Date |
|---|---|---|
| 219,384 | Great Britain | Aug. 7, 1924 |
| 208,863 | Great Britain | Jan. 3, 1924 |